(12) United States Patent
Ayrapetian et al.

(10) Patent No.: US 7,499,464 B2
(45) Date of Patent: Mar. 3, 2009

(54) BUFFERED CROSSBAR SWITCH WITH A LINEAR BUFFER TO PORT RELATIONSHIP THAT SUPPORTS CELLS AND PACKETS OF VARIABLE SIZE

(76) Inventors: Robert Ayrapetian, 17490 Calle Mazatan, Morgan Hill, CA (US) 95037; Edward Ayrapetian, 17490 Calle Mazatan, Morgan Hill, CA (US) 95037; Serob Douvalian, 17490 Calle Mazatan, Morgan Hill, CA (US) 95037

( * ) Notice: Subject to any disclaimer, the term of this patent is extended or adjusted under 35 U.S.C. 154(b) by 496 days.

(21) Appl. No.: 11/400,367

(22) Filed: Apr. 6, 2006

(65) Prior Publication Data

US 2006/0256783 A1    Nov. 16, 2006

Related U.S. Application Data

(60) Provisional application No. 60/669,028, filed on Apr. 6, 2005.

(51) Int. Cl.
*H04L 12/28* (2006.01)

(52) U.S. Cl. ............... 370/419; 370/412; 370/428; 710/52

(58) Field of Classification Search .................. None
See application file for complete search history.

(56) References Cited

U.S. PATENT DOCUMENTS

| 6,915,372 | B2 * | 7/2005 | Magill et al. ............... 710/317 |
| 7,363,400 | B2 * | 4/2008 | Tanaka et al. ............... 710/56 |
| 2005/0226263 | A1 * | 10/2005 | Panigrahy et al. ........... 370/419 |
| 2006/0129525 | A1 * | 6/2006 | Rijpkema ..................... 707/2 |
| 2007/0081515 | A1 * | 4/2007 | Dielissen et al. ............ 370/351 |

* cited by examiner

*Primary Examiner*—Bob A Phunkulh
(74) *Attorney, Agent, or Firm*—David R. Stevens; Stevens Law Group

(57) ABSTRACT

A buffered crossbar switch is provided with a buffer to port relationship that supports cells and packets of variable size. A novel scheduler is provided that allows for an efficient crossbar switch, where the relationship between the number of internal buffers is less than the number of ports squared. This allows for a switch that can be implemented that requires less buffer memory.

6 Claims, 4 Drawing Sheets

BUFFERED CROSSBAR SWITCH WITH A LINEAR BUFFER TO PORT RELATIONSHIP THAT SUPPORTS CELLS AND PACKETS OF VARIABLE SIZE

PRIORITY

This application claims priority to U.S. Provisional Patent Application Ser. No. 60/669,028, entitled Buffer Crossbar switch with a Linear Buffer to Port Relationship, filed Apr. 6, 2005.

BACKGROUND

Packet switching is the core technology of the Internet. The Internet consists of end-hosts, links, and routers. A router consists of several processing stages. At the very least, a router has two main processing stages: address lookup and switching. This patent focuses on the switching stage of the Routers/Switches.

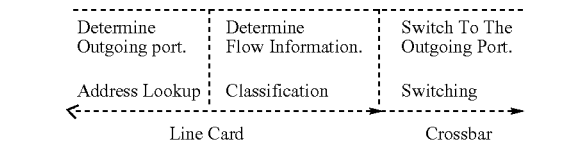

Network operators would like to build their networks using routers that give performance guarantees. They want routers that provide throughput, bandwidth and delay guarantees. For example, large corporations might want to guarantee a fixed bandwidth between their company sites. Similarly, if a network operator can guarantee a maximum delay through their network, they can also sell services to customers who run real-time applications such as video and voice.

FIG. 1 is an illustration of an architecture of a buffered crossbar with three ports. This is a buffered Crossbar that includes an internal FIFO in cross points. A buffered Crossbar running at a speedup of two can also behave identically to an OQ switch. The scheduler for a buffered crossbar allows inputs and outputs to schedule independently and in parallel making it much simpler and, therefore, more practical than for a traditional unbuffered crossbar. Simplifying the scheduler comes at the expense of a more complicated crossbar; it now has to hold and maintain $N^2$ packet buffers. Generally, in a buffered crossbar, the buffer size of each FIFO buffer should be at least twice the amount of traffic that can arrive at a crossbar port over the roundtrip time delay of a control signal exchanged between the Line Card and the Crossbar. The roundtrip time delay (RTT) is in the order of 600 to 800 ns. As a result, for 10 Gbps line rate, the minimum size of each FIFO buffer becomes 2 Kbytes.

Minimum Internal Buffer Size: $2*N*N$ Kbytes.

| N | Buffer Size (Mbytes) | Number Of FIFOs |
|---|---|---|
| 16 | 0.5 | 256 |
| 32 | 2.0 | 1024 |
| 64 | 8.0 | 4096 (non manufacturable) |

Current buffered crossbar switch architectures require the use of $N*N$ buffers for an N port switch. This memory requirement severely limits the number of ports that a single chip can handle. This limitation is due to the fact that on-chip memory is very expensive in terms of cost and space. With current processes and switch architectures, the largest realizable switch fabric which could support packets with Variable size up to 2 KBytes can be at most 32×32 with very big internal memory. Current buffered crossbar switch architectures do not Support Jumbo packets with Variable Packet size up to 64 Kbytes with switch size more than 8×8.

Thus, there exists a need in the art for a buffered crossbar that requires less space for buffers, yet that delivers desired performance. As will be seen, the invention provides this in a novel and elegant manner.

DETAILED DESCRIPTION

Figure 1:
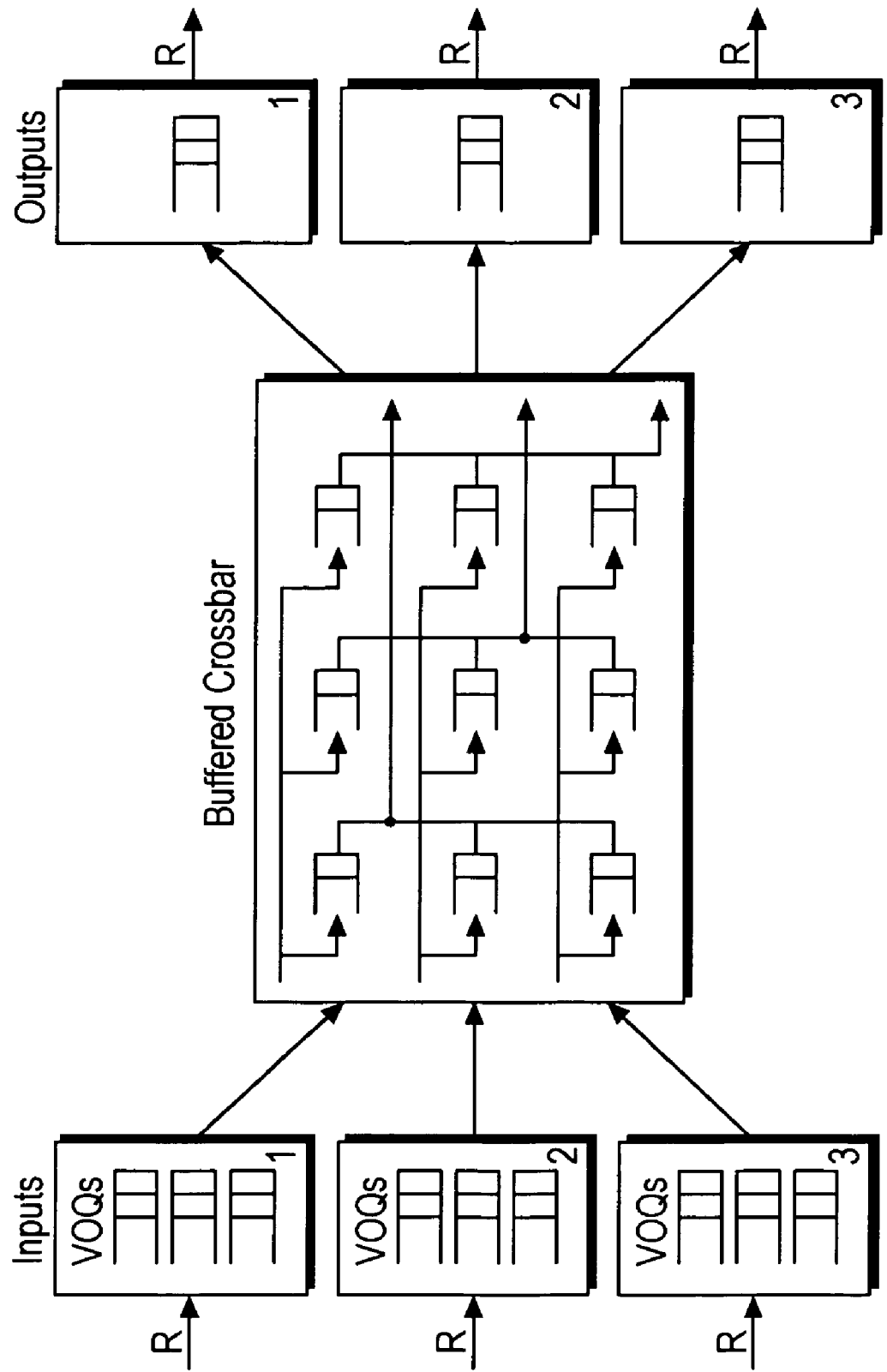
FIG. 1 is a prior art illustration of a buffered crossbar switch of the prior art.

The invention is directed to a buffered crossbar switch with a linear buffer to port relationship that supports cells and packets of variable size. The embodiments set forth below, illustrated in the figures and further described in text and figures in the appendix are illustrations of embodiments of the invention.

In one embodiment, the invention provides a buffered crossbar switch for use in a network system having a line card that generates data packets. The buffered crossbar switch has multiple buffers and a linear buffer to port relationship, where the number of buffers is less than the number of ports squared. The cross bar switch includes an internal buffer address decoder and control module, where the decoder is configured to receive address information from a line card scheduler and to decode the address information and generate a decoded address and wherein the control module negotiates the transfer of data from a line card to internal buffers. The switch further includes an input configured to receive data packets from a line card and to deserialize the data packets to generate a deserialized output, and a plurality of buffer structures, one for each port, each configured to receive a deserialized output from the input and to control an internal buffer system Each buffer structure includes a buffer read/write control configured to receive decoded addresses from the internal buffer address decoder and negotiate data transfers with the address decoder based on an internal buffer status. There are also a plurality of multiplexers that route the received deserialized data from the input control by the buffer read/write control s. A plurality of buffers is provided, where each buffer is configured to receive data packets from the an associated multiplexer and to send a report signal, indicating whether the buffer is full, to the buffer read/write control. A central buffer is configured to receive outputs from the plurality of buffers and to generate an output.

The internal buffer address decoder may further includes a state machine having predetermined control commands in response to the state of the decoder process.

The number of buffers in each buffer structure may be a fixed number between 1 and K, where K is the number of ports.

The number of buffers may depend on the number of ports and the bit rate to be used.

In operation, for use in a network system having a line card that generates data packets, a method of performing the operations of a buffered crossbar switch having multiple buffers and a linear buffer to port relationship, where the number of buffers of the switch is less than the number of ports squared of the switch, and where the process is controlled by a scheduler, includes:

receiving serial data from a line card with a serial to parallel conversion module;

converting the serial data in to generate individual words of a predetermine length;

routing the words to a plurality of multiplexers;

receiving request and address signals from a line card with a inter buffer address controller;

negotiating the transfer of data between at least one line card at least one switch buffer with a state machine;

combining a plurality of addresses into a plurality of multi-bit busses;

transmitting the recombined busses from a buffer to an internal buffer control module;

determining the availability of a buffer with control logic; if a buffer is available, transmitting a transfer accept signal from control logic to an internal buffer address decoder module;

transmitting an acknowledgement signal from the internal buffer address decoder to the line card to begin the transfer of data from the line card; and transmitting a queue signal from the internal buffer control to a reserved buffer to receive the data from the transfer from the line card; and writing the line card data to the reserved buffer;

upon completion of a write operation, updating a read priority table to ensure that the data is read from the buffer in the order of the data's arrival.

The method may further include receiving a plurality of request commands and an address number from corresponding line card, wherein the address number indicates a requested buffer and combining a plurality of addresses in to N-bit busses, wherein N is the number of addresses are N. Determining the availability of a buffer with control logic may include receiving a write request from a line card and determining the availability of a buffer based on the write request and the corresponding address requested by the line card.

The invention is directed to a novel practical architecture, a next generation of buffered Crossbar Switch. An architecture configured according to the invention has the potential to provide 100% throughput under uniform and unbalanced traffic. It also provides scalability and timing relaxation for scheduling. It further removes centralized scheduling and allows the scheduling logic to be distributed to the Line cards. The scheduler is not required to make a decision for every arriving cell. The scheduling algorithm operates in a frame slot. Such a system also uses a small speedup of 1.1 and uses small intermediate Buffers to provide variable length internet packet as well as Cell (64 bytes) Switching. It also supports direct jumbo Packet switching (up to 64 Kbytes). It also supports 8 priority levels for up to 64×64 switch fabric with 10 Gbps per port, and supports 4 priority levels for up to 32×32 switch fabric with 40 Gbps per port. An N×N Crossbar switch can use K*N internal Buffers, where K could be from 2 to N.

Figure 2:
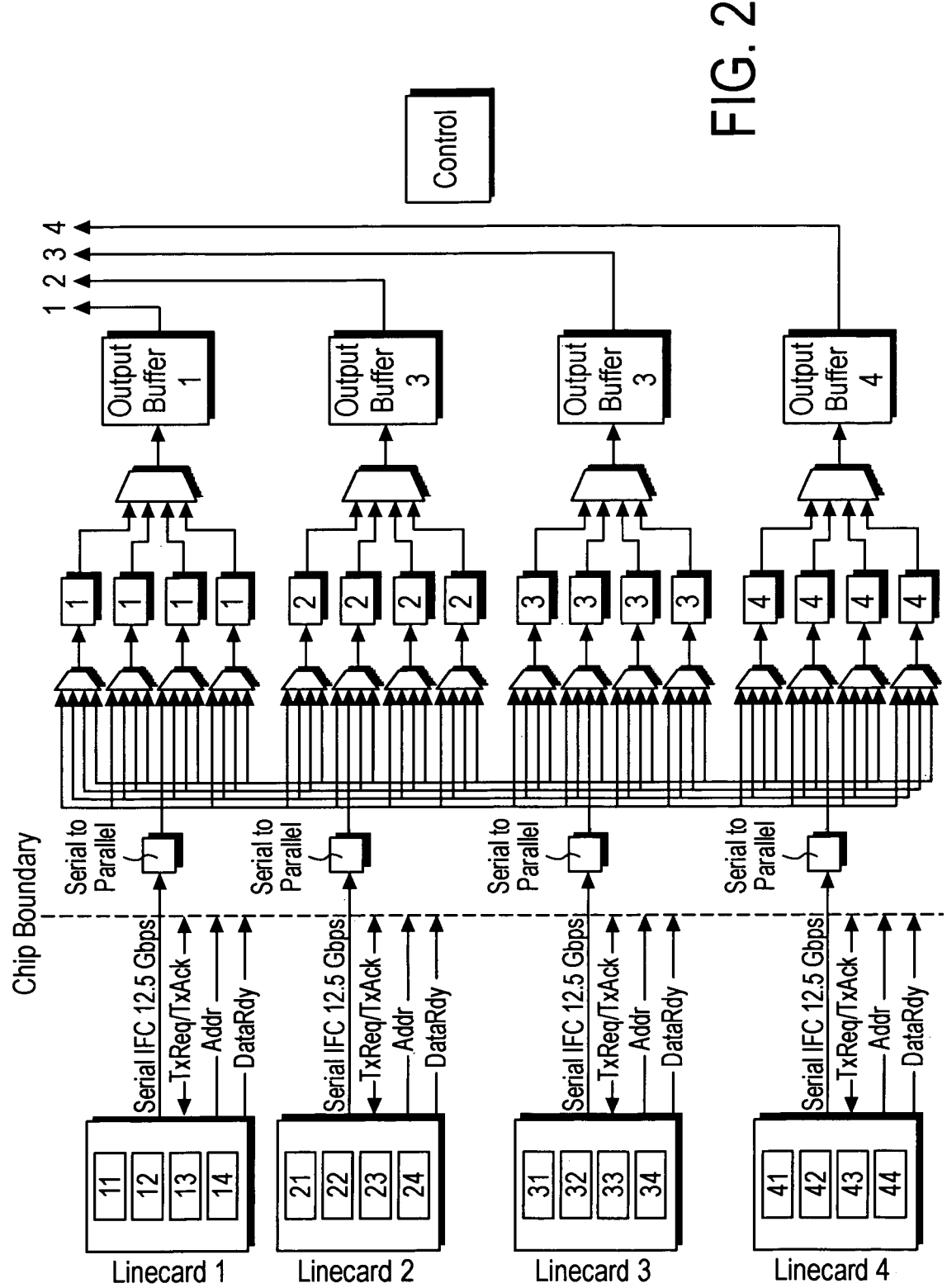
FIG. 2 is a diagrammatic illustration of a buffered crossbar switch configured according to the invention.

The proposed switch architecture is shown in FIG. 2. The example is for a 4×4 switch with four buffers per output port. The line cards on the left of the diagram implement a standard Virtual Output Queue (VOQ) buffering scheme. The queue buffers interface to the switch using a serial link that allows for a transfer rate of 12.5 Gbps. Several slower serial links can be used, as long as the overall transfer rate remains the same. In addition, the current FPGA based design implements two handshake signals. One bidirectional line is used by the line card to request permission to transfer data and by the switch to grant or deny the request. Another line is used to signal the switch when to latch the incoming serial data (serial clock). The intermediate buffer to which the line card requests a write is specified by an address bus, or a serial address line. The final version of the chip will implement an interface according to the targeted line card.

Inside the chip, the data is converted to parallel form and is fed to a network of muxes that connect to internal buffers. The N×N crossbar switch uses K buffers ($2<=K<=N$) for every destination port. All buffers can be written at once, but only one can be read. A buffer cannot be read and written at the same time.

The invention is directed to architectures that support both cell and variable length IP packet switching.

In the description below the term "cells" is used to represent both cells and packets. Those aspects of the design that are specific to either cell or packet operation are pointed out where needed.

The general architecture and scheduler for N×N crossbar switch are described below:

1. Cell: 40/64 bytes.
2. IP Packet: from 40 to 1518 bytes.
3. Frame slot: Frame slot: One Frame is M cells. Frame slot is an M cell period. During each frame slot M cells are transferred from input $VOQ_{i,j}$ to intermediate Buffer $B_{j,k}$ and from intermediate buffer $B_{j,k}$ to output port
4. Input Queue: There are N VOQs at each input port. A VOQ at input i that stores cells/packets for output j is denoted as $VOQ_{i,j}$.
5. Intermediate Buffer: Each output port j, (j=1,2, . . . ,N) has K Intermediate Buffers $B_{j,k}$, k=1,2, . . . ,K, with size of M cells. The integer K can be anywhere from 2 to N. The choice of K and M depends on the number of ports N, the Round Trip delay and the maximum size of the IP packet. For example for $N<=32$ and Packets with max size$<=1518$, the value of K and speedup S could be chosen 4 and 1.1 respectively. Other choice could be K=2, S=1.5, and so on. We assume that speedup S could be from 1.0 to 2.0.

The size of the Intermediate Buffer $B_{j,k}$ should guarantee at least twice the amount of traffic that can arrive at a crossbar port over the round trip time delay. For example, if the roundtrip time delay is on the order of 600 to 800 nsecs, then as a result, for a 10 Gbps line rate the round trip delay becomes RT_INKBytes=2*800*10 bits ~2 KBytes. Hence, the total internal Buffer size is K*M*N KBytes, where the size of M>=RT_INKBytes.

N×N Crossbar Switch Internal Buffer Size (IBS):

Switching either Cells or Variable Length Packets of size up to 1518 Bytes.

Number of Internal Buffers: K*N, $2<=K<=N$.

Total Internal Buffer Size=K*M*N KBytes, where M is a internal buffer size of $B_{j,k}$ in KBytes.

6. Flow Control: Three parallel processes take place during each Frame slot:
6.1 Transfer of cells from VOQ buffers of the linecards into intermediate buffers of the switch. This process is defined by the matrix of current transfers CT[i].

CT[i]=−1, if in current frame slot there is no transfer of data from VOQ buffers of the linecard i. CT[i]=k, if in current frame cells from VOQ buffer k of the linecard i are transferred into one of intermediate buffers of the output k.

6.2. Calculation of the matrix NT[i] of the data transfers from VOQs of the linecards to intermediate buffers of the switch during the next frame slot.

At the end of each frame slot matrix of transfers in next frame slot NT[i] defines new matrix of current transfers CT[i].

Calculation of the matrix NT[i] is provided by the schedulers of the linecards, and the switch.

a) Let A[i,k] is matrix of possible transfers.

A[i, k]=0, if according to the scheduler of the linecard i there will not be transfers from its VOQ buffer k in next frame slot.

A[i, k]=1, if according to the scheduler of the linecard i it is possible transfer of cells from its VOQ buffer k.

To define A[i, k] values linecard i scheduler scans its VOQs, and sets A[i, k]=1, if VOQ buffer k contains not less than M cells, and A[i,k]=0, if VOQ buffer k is empty.

If the VOQ buffer k is not empty, but contains less than M cells

A[i,k]=0, if $S[i, k] < N\_starvation$.
1, if $S[i, k] > N\_starvation$.

where S[i, k], is starvation parameter, that is increased by 1 each frame slot, if the VOQ buffer is not empty, and is set to zero after each transfer of data from the VOQ buffer k of the linecard i.

N_starvation=is an experimental parameter with recommended value

N_starvation=10N.

b) The switch scheduler monitors the state of its intermediate buffers and defines the number of free buffers b[k] that may be used for transfers in the next frame slot. To ensure uniform load of output ports scheduler analyzes elements of the matrix A[i,k] along its diagonals in ROUND-ROBIN order.

Let Order=0, 1, ... N−1 is the number of the diagonal, that increases in circular manner each frame slot.

For example, if N=4 there are 4 diagonals

A[0,0], A[1,1], A[2,2], A[3,3]

A[1,0], A[2,1], A[3,2], A[0,3],

A[2,0], A[3,1], A[0,2], A[1,3],

A[3,0], A[0,1], A[1,2], A[2,3]

In frame slots 0, 4,8, ... =0 mod(4) the Order=0. In frame slots 1,5,9, ... =1 mod(4) the Order=1, and so on.

So, if A = 0, 1, 1, 0
       1, 1, 0, 0
       0, 1, 0, 1
       1, 1, 1, 1 and we have two buffers for each destination, calculation of NT[i] is equivalent to choosing no more that one non zero element in each row and, no more than two elements in each column. But this choice has to be done in order of increasing number of diagonals, starting with the diagonal equal to Order.

So we have solutions for different values of Order.

| Order = 0 | Order = 1 | Order = 2 | Order = 3 |
|---|---|---|---|
| 0, 1, +1, 0 | 0, 1, +1, 0 | 0, 1, +1, 0 | 0, +1, 1, 0 |
| 1, +1, 0, 0 | +1, 1, 0, 0 | 1, 1, 0, 0 | 1, +1, 0, 0 |
| 0, +1, 0, 1 | 0, +1, 0, 1 | 0, 1, 0, +1 | 0, 1, 0, +1 |
| 1, 1 1, +1 | 1, 1 +1, 1 | +1, +1 1, 1 | +1, 1 1, 1 | where sign + corresponds to chosen element.

For example in case Order=1 we have NT[0]=2, NT[1]=0, NT[2]=1, NT[3]=2.

Calculation of the matrix NT[i] may be organized also, as a sequence of requests and grants. For example in frame slots corresponding to Order=1.

Linecard 0 must scan VOQs in order 3, 2, 1, 0

Linecard 1 must scan VOQs in order 0, 3, 2, 1

Linecard 2 must scan VOQs in order 1, 0, 3, 2

Linecard 3 mast scan VOQs in order 2, 1, 0, 3

Consequently linecard 0 makes first request for k=2 because A[0,3]=0, and A[0, 2]=1.

linecard 1 makes first request for k=0 because A[1,0]=1 linecard 2 makes first request for k=1 because A[2,1]=1 linecard 3 makes first request for k=2 because A[3,2]=1

Requests from linecards 1,2,3 correspond diagonal Order=1 and switch scheduler accepts these requests (sends grant massage).

Than switch scheduler passes to next diagonal and also accepts request A[0,3].

Let us check also what will happen in case Order=0, if there is only one free buffer for each direction.

The solution is 0  1  +1  0
1  +1  0  0
0  1  0  1
1  1  1  +1

Let us consider requests of the linecard 2, that scans its buffers in order k=2,1,0,3.

So the first request is k=1, it lies on diagonal 1, and is denied because of the granted request from linecard 1 on diagonal Order=0.

The next request is k=3, it lies on diagonal 3, and is also denied because of granted request from linecard 3 on diagonal Order=0.

To exclude starvation the scheduler keeps track of preferable transfers from Linecards to out ports.

For each out port k the parameter sched[k] defines the number of the preferable Line card.

When a write to a certain buffer is requested by the Line card i, the switch scheduler grants the request only if:

a) two or more of K intermediate buffers to requested address are empty.

b) There is one empty buffers to requested address k and sched[k]=i, i.e. transfer from Line card i to out port k is preferable.

When request to out port k is granted to preferable line card (sched[k]=i), the number sced[k] is incremented by 1 in circular manner (sched[k]++% N).

The preferable line card number sced[k] is also incremented by 1 in cases when there are no requests from line card sched[k] to out port k.

Otherwise the request is denied. If more than one linecard requests a write to a certain intermediate buffer address, the requests are granted based on how many buffers are empty and a simple algorithm (either hardcoded table or random number generator) that determines the linecard priority. Once a write request to a certain buffer has been granted, that buffer is reserved and all requests by other linecards to write to that buffer will be denied.

6.3 The cells from intermediate buffers are placed into output buffers based on arrival order. Cells which were written into the intermediate buffer first are first to be transferred to the output buffers.

Figure 3A:
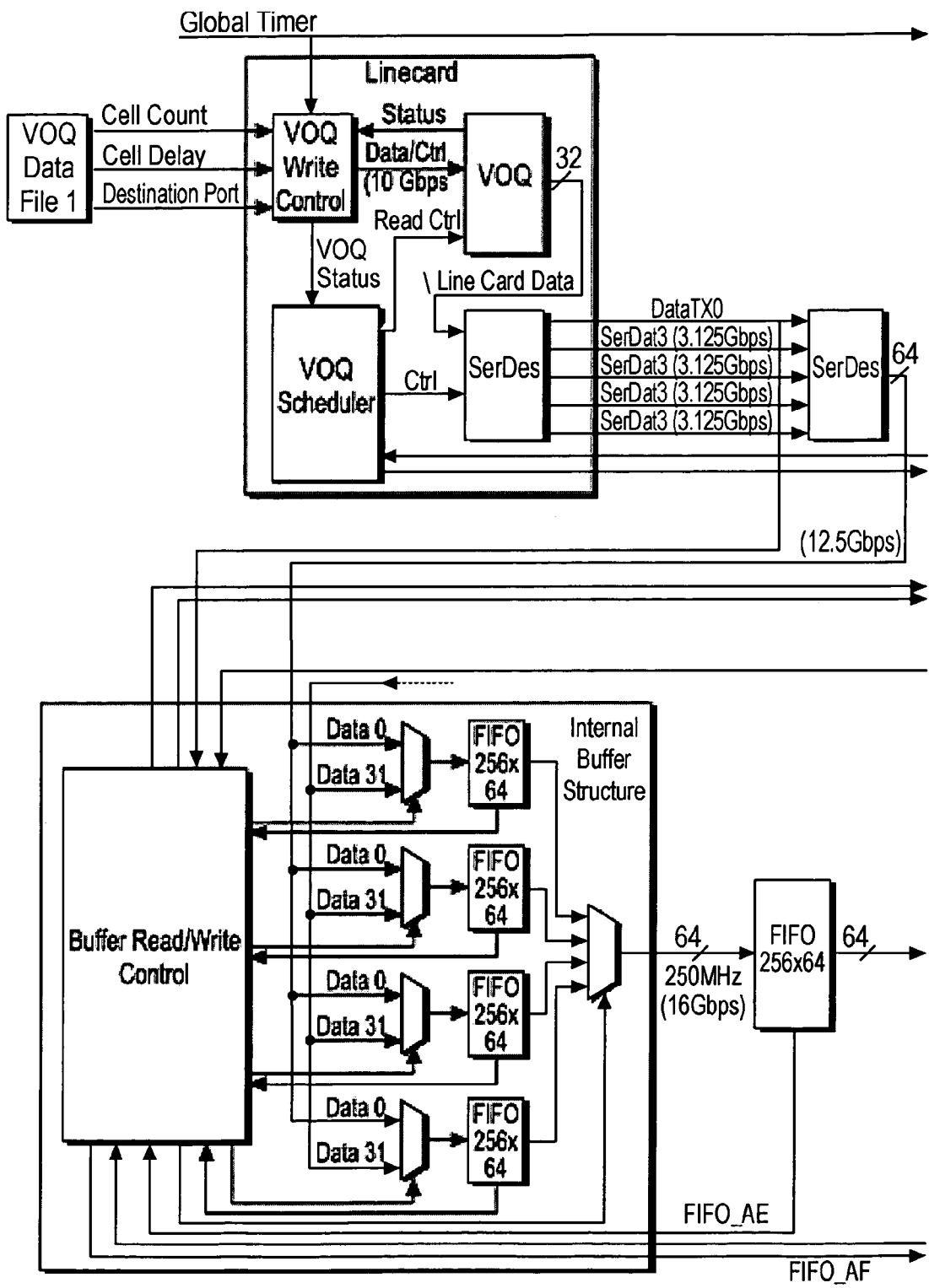
FIG. 3 is a diagrammatic view of an FPGA configured according to the invention.
Figure 3B:
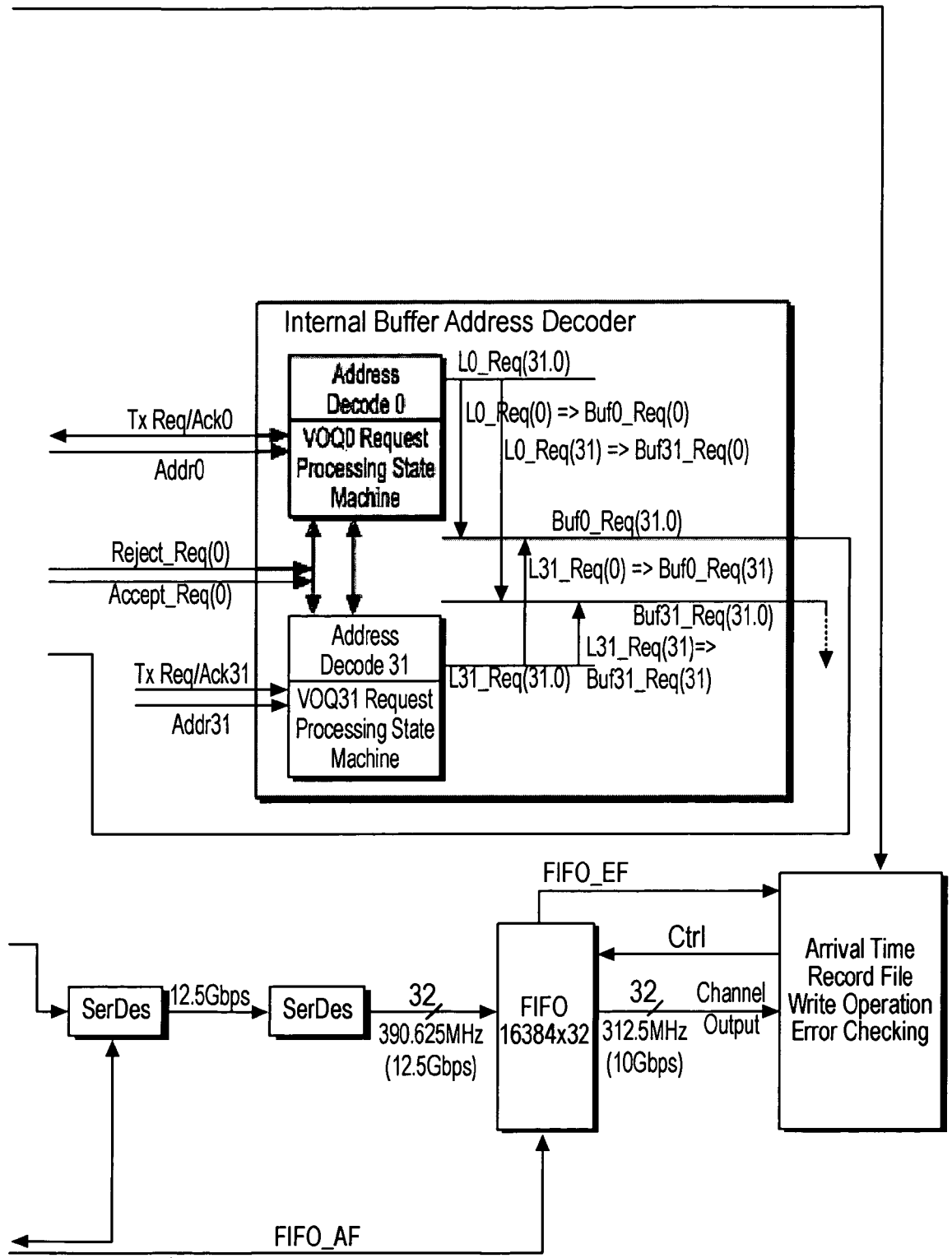

FIG. 3 is a diagrammatic view of an FPGA configured according to the invention. The attached appendix includes 130 pages, which includes further embodiments and detailed descriptions of the invention. All of the appendix is included in the specification. The appendix describes the details of one embodiment of an FPGA simulation, and further describes relevant details of the operation of the invention.

The invention claimed is:

1. For use in a network system having a line card that generates data packets, a buffered crossbar switch having multiple buffers and a linear buffer to port relationship, where the number of buffers is less than the number of ports squared, where the number of buffers of the switch is linearly related to the number of ports of the switch, comprising:
   an internal buffer address decoder and control module, where the decoder is configured to receive address information from a line card scheduler and to decode the address information and generate a decoded address and wherein the control module negotiates the transfer of data from the line card to internal buffers;
   an input configured to receive data packets from the line card and to deserialize the data packets to generate a deserialized output; and
   a plurality of buffer structures, one for each port, each configured to receive a deserialized output from the input and to control an internal buffer system, where the each buffer structure includes
   a buffer read/write control configured to receive decoded addresses from the internal buffer address decoder and negotiate data transfers with the address decoder based on an internal buffer status;
   a plurality of multiplexers that route the received deserialized data from the input control by the buffer read/write control;
   a plurality of buffers, where each buffer is configured to receive data packets from the an associated multiplexer and to send a report signal, indicating whether the buffer is full, to the buffer read/write control; and
   a central buffer configured to receive outputs from the plurality of buffers and to generate an output.

2. A system according to claim 1, wherein the internal buffer address decoder further includes a state machine having predetermined control commands in response to the state of the decoder process.

3. A system according to claim 1, wherein the number of buffers in each buffer structure is a fixed number between 1 and K, where K is the number of ports.
   Wherein the number of buffers depends on the number of ports and the bit rate to be used.

4. For use in a network system having a line card that generates data packets, a method of performing the operations of a buffered crossbar switch having multiple buffers and a linear buffer to port relationship, where the number of buffers of the switch is less than the number of ports squared of the switch, and where the process is controlled by a scheduler, the method comprising:
   receiving serial data from the line card with a serial to parallel conversion module;
   converting the serial data in to generate individual words of a predetermine length;
   routing the words to a plurality of multiplexers;
   receiving request and address signals from the line card with an inter buffer address controller;
   negotiating the transfer of data between at least one line card at least one switch buffer with a state machine;
   combining a plurality of addresses into a plurality of multi-bit busses;
   transmitting the recombined busses from a buffer to an internal buffer control module; determining the availability of a buffer with control logic;
   if the buffer is available,
      transmitting a transfer accept signal from control logic to an internal buffer address decoder module;
      transmitting an acknowledgement signal from the internal buffer address decoder to the line card to begin the transfer of data from the line card;
      transmitting a queue signal from the internal buffer control to a reserved buffer to receive the data from the transfer from the line card; and
      writing the line card data to the reserved buffer;
   upon completion of a write operation, updating a read priority table to ensure that the data is read from the buffer in the order of the data's arrival.

5. A method according to claim 4, further
   comprising receiving a plurality of request commands and an address number from corresponding line card, wherein the address number indicates a requested buffer;
   combining a plurality of addresses in to N-bit busses, wherein N is the number of addresses are N.

6. A method according to claim 4, wherein in determining the availability of a buffer with control logic includes receiving a write request from a line card;
   determining the availability of a buffer based on the write request and the corresponding address requested by the line card.

* * * * *